United States Patent
Takegahara et al.

(10) Patent No.: US 6,356,799 B1
(45) Date of Patent: Mar. 12, 2002

(54) METHOD OF AND APPARATUS FOR DETERMINING CORE-LESS MACHINING SHAPE, AND COMPUTER-READABLE STORAGE MEDIUM STORING PROGRAM FOR DETERMINING CORE-LESS MACHINING SHAPE

(75) Inventors: Takashi Takegahara, Hachioji; Shigetoshi Takagi, Oshino-mura, both of (JP)

(73) Assignee: FANUC, Ltd., Yamanashi (JP)

(*) Notice: Subject to any disclaimer, the term of this patent is extended or adjusted under 35 U.S.C. 154(b) by 0 days.

(21) Appl. No.: 09/269,221
(22) PCT Filed: Jul. 24, 1998
(86) PCT No.: PCT/JP98/03322
§ 371 Date: Mar. 23, 1999
§ 102(e) Date: Mar. 23, 1999
(87) PCT Pub. No.: WO99/04922
PCT Pub. Date: Feb. 4, 1999

(30) Foreign Application Priority Data

Jul. 24, 1997 (JP) .............................................. 9-212696

(51) Int. Cl.[7] .............................................. G06F 19/00
(52) U.S. Cl. ........................................ 700/182; 700/162
(58) Field of Search ............................... 700/162, 164, 700/193, 182, 180, 84, 86, 184, 183, 175, 173, 179, 187; 318/570, 568.1

(56) References Cited

U.S. PATENT DOCUMENTS 4,249,243 A * 2/1981 Yoshida et al. .............. 700/174
5,113,050 A * 5/1992 Seki et al. ................... 700/170
5,919,380 A * 7/1999 Margare ....................... 219/13
6,243,691 B1 * 6/2001 Inamasu et al. ............. 700/180

FOREIGN PATENT DOCUMENTS

| JP | 3-104518 | 5/1991 |
| JP | 5-277835 | 10/1993 |
| JP | 6-304818 | 11/1994 |

* cited by examiner

Primary Examiner—William Grant
Assistant Examiner—Kidest Bahta
(74) Attorney, Agent, or Firm—Staas & Halsey

(57) ABSTRACT

A method of and an apparatus for determining a core-less machining shape, in which an attribute of core-less machining or contour machining is automatically designated to a machining shape created in advance, and a storage medium storing a core-less machining shape determining program. Programs for judging a size of a machining shape based on horizontal and vertical maximum dimensions, a diameter or a radius of a circle, a peripheral length, a width and an area are stored in an automatic programming device in advance. Programs to be executed are selected from the stored programs and a way of logical operation on results of judgment by the selected programs is designated. The selected programs are executed based on data of a machining shape and reference values for judgment, and the selected logical operation is performed on the results of the judgment by the selected programs to determine the size of the machining shape, and an attribute of the core-less machining or the contour machining is automatically designated to the machining shape.

6 Claims, 3 Drawing Sheets

METHOD OF AND APPARATUS FOR DETERMINING CORE-LESS MACHINING SHAPE, AND COMPUTER-READABLE STORAGE MEDIUM STORING PROGRAM FOR DETERMINING CORE-LESS MACHINING SHAPE

TECHNICAL FIELD

The present invention relates to a method of determining a core-less machining shape using a system for creating NC data for wire-cut electric discharge machining such as an automatic programming device, a CAD/CAM system, a numerical control device or a wire-cut electric discharge machine, and an apparatus for carrying out the method and a storage medium storing a program for determining the core-less machining shape.

BACKGROUND ART

As ablation machining performed by the wire-cut electric discharge machining, there are known contour machining in which cutting is performed along a contour of a machining shape and then a core is removed manually, and core-less machining in which machining is started from a prepared hole inside a machining shape and all the portion inside the contour of the machining shape is removed by the electric discharge machining. The former is suitable for machining of a relatively large shape, while the latter is suitable for machining of a relatively small shape and contributes to reduction of overall time of the machining since the latter machining does not involve process of manually removing a core.

For reducing overall time required for the wire-cut machining, it is important to selectively apply contour machining and core-less machining in dependence on a size of a machining shape.

It is generally adopted to design a shape of a product to be machined using an automatic programming device and a CAD/CAM system. In such system, attributes of objects (i.e., machining shapes) are managed for each object, separately. Attributes are designated to objects in a manner that objects are selected one by one and attributes are designated to each object, or in a manner that groups consisting of a plurality of objects are formed in advance and attributes are designated to all the objects belonging in each group, or in a manner that attributes are designated to all the objects included in each specific layer. In any case, judgment of which attribute should be designated to a specific object is totally left to an operator.

Thus, an operator needs to decide on his or her own whether an attribute of the contour machining or an attribute of the core-less machining should be designated to a machining shape. In particular, there is a problem that it is difficult to judge a size of each machining shape, after the whole process of designing has been completed and many objects have been created. Further, oversight may happen in selecting objects one by one or forming groups of objects, so that an appropriate attribute may fail to be designated to a machining shape. It is technically possible to provide a layer for the contour machining and a layer for the core-less machining in advance, and to manage contour machining shapes and core-less machining shapes based on the layers. However, if it becomes later necessary to change a criterion for judging the size and therefore to change the designated attributes, the same problems will arise such as the difficulty of judging the size of the machining shape and the oversight.

CAD software having an information pallet for indicating attributes of objects and capable of providing attribute information such as a position in X-Y coordinate system, maximum dimensions in horizontal and vertical directions, a diameter or a radius, etc. of a selected object in the form of numerical data so that the information can be checked easily is available on the market. Such CAD software is useful in judging whether an attribute of the contour machining or an attribute of the core-less machining should be designated. However, it requires selecting objects one by one, checking information about each object and then designating an attribute. Thus, it requires cumbersome operations in the system, and problems such as oversight as mentioned above remain unsolved.

DISCLOSURE OF INVENTION

An object of the present invention is to provide a method of and an apparatus for determining a core-less machining shape, in which an attribute of core-less machining or an attribute of contour machining can be automatically designated to a machining shape, and a computer readable storage medium storing a program for determining a core-less machining shape.

A core-less machining shape determining method of the present invention comprises the steps of: judging a size of a machining shape based on data of the shape created in advance, and automatically determining appropriate attributes to one group of the machining shapes or both group of the machining shapes, to designate a core-less machining to a machining shape having a size equal to or smaller than a set value, and designate a contour machining to a machining shape having a size larger than the set value. The present invention also provides an apparatus for creating NC data for wire-cut electric discharge machining, which performs the above core-less machining shape method. Further, a program for determining whether or not the core-less machining is applied to a machining shape and automatically designating an appropriate attribute to the machining shape is stored in a storage medium, and such program is executed by a computer in a device for creating NC data for the wire-cut electric discharge machining.

More specifically, only an attribute of the core-less machining is designated to a machining shape which has a size equal to or smaller than a set value, or only an attribute of the contour machining is designated to a machining shape which has a size larger than the set value. Alternatively, an attribute of core-less machining is designated to a machining shape having a size equal to or smaller than the set value, and also an attribute of contour machining is designated to a machining shape having a size larger than the set value.

Further, one or more ways of judgment are selected from a plurality of ways of judgment for determining a size of a machining shape, a logical product or a logical sum is selected as a logical operation to be performed on the result of the selected ways of judgment, and the selected logical operation is performed on the result of the selected ways of judgment to judge the size of a machining shape and designate an attribute of the core-less machining or an attribute of the contour machining to the shape.

BEST MODE OF CARRYING OUT THE INVENTION

Figure 1:
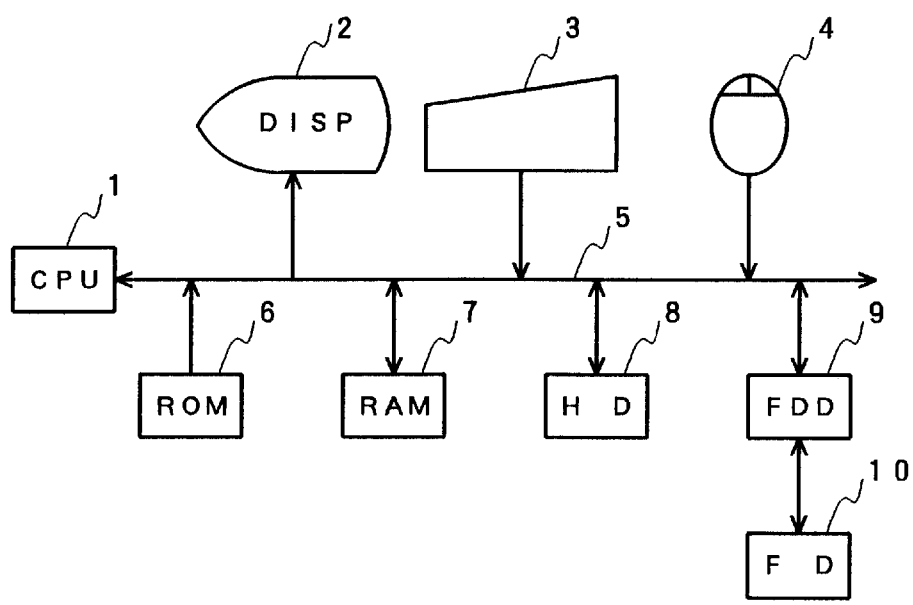
FIG. 1 is a block diagram schematically showing an NC automatic programming device according to an embodiment of the present invention.

FIG. 1 is a block diagram schematically showing an embodiment of an NC automatic programming device to which the present invention is applied.

In FIG. 1, reference numeral 1 denotes a micro processor (CPU), 6 a ROM storing a program for starting the NC automatic programming device, 8 a hard disc storing various control programs, system programs, etc., 7 a RAM for temporarily storing data for use in processing of calculation or display, 9 a disc drive unit for use in reading data on a machining shape, a machining program and the like which are stored in a floppy disc 10 and writing new data in the floppy disc 10, 3 a keyboard, 2 a display, and 4 a mouse for use in moving a cursor and making a choice. These elements are connected with the CPU 1 via a bus 5.

Same as a conventional NC automatic programming device, the present NC automatic programming device has a shape inputting function for creating shape data on a machining shape through input operation using the keyboard 3 or the mouse 4, an automatic programning function for automatically creating a series of machining programs in accordance with created data on a machining shape, conditions of cutting and the like, and a drawing function for drawing a path or a position of a tool through simulating a machining program which is automatically created simultaneously with the simulation or has been created before the simulation. System programs necessary for executing those functions are held in the hard disc 8. Each function is selected by moving the cursor on the display 2 and selecting a corresponding item in a menu by the mouse 4.

Information about machining shapes is managed for each object, separately. Same as in a conventional case, the information managed for each object includes maximum dimensions of a machining shape in horizontal and vertical directions, that is, in x-axis and y-axis directions, and if an object is a round shape, a diameter or a radius thereof.

In the present invention, the information managed for each object further includes, for example, a peripheral length of a machining shape (length of a path), a width of a machining shape (in the case where an object is created using a double line function or an offset function), an area of a machining shape (a size of a portion surrounded by a closed path) and the like.

Further, a program for judging the size of a machining shape, based on the maximum dimensions thereof in horizontal and vertical directions, a program for judging the size of a round machining shape, based on the diameter or radius thereof, a program for judging the size of a machining shape, based on the peripheral length thereof, a program for judging the size of a machining shape, based on the width thereof, a program for judging the size of a machining shape, based on the area thereof, and a program for determining whether to machine a shape by core-less machining including a program for automatically designating, to a machining shape, an attribute to be machined by core-less machining or an attribute to be machined by contour machining appropriately have been loaded from a floppy disc or the like into the hard disc 8, so that the programs can be developed in the RAM 7 in accordance with a call by the CPU 1 for performing necessary operations.

Figure 3:
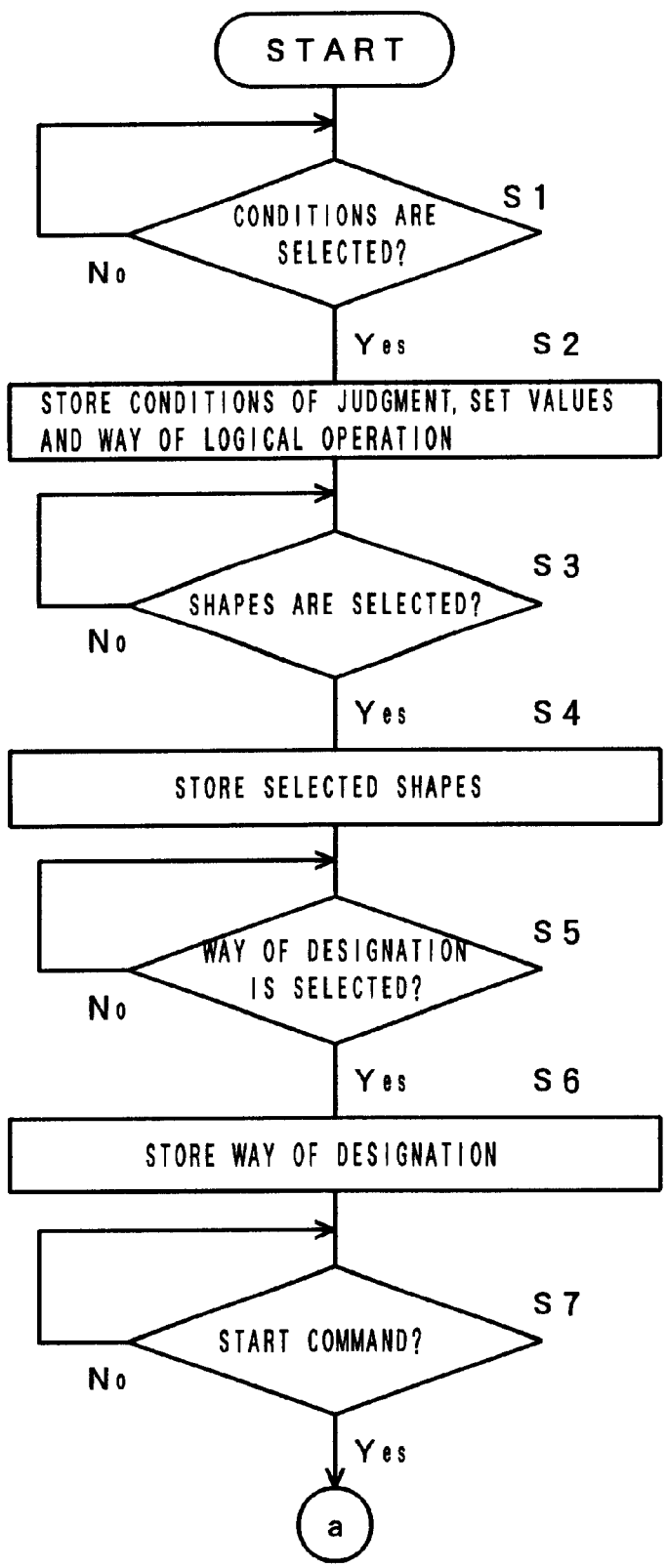
FIG. 3 is part of a flowchart of a program for determining whether to machine a shape by core-less machining, executed by the NC automatic programming device.
Figure 4:
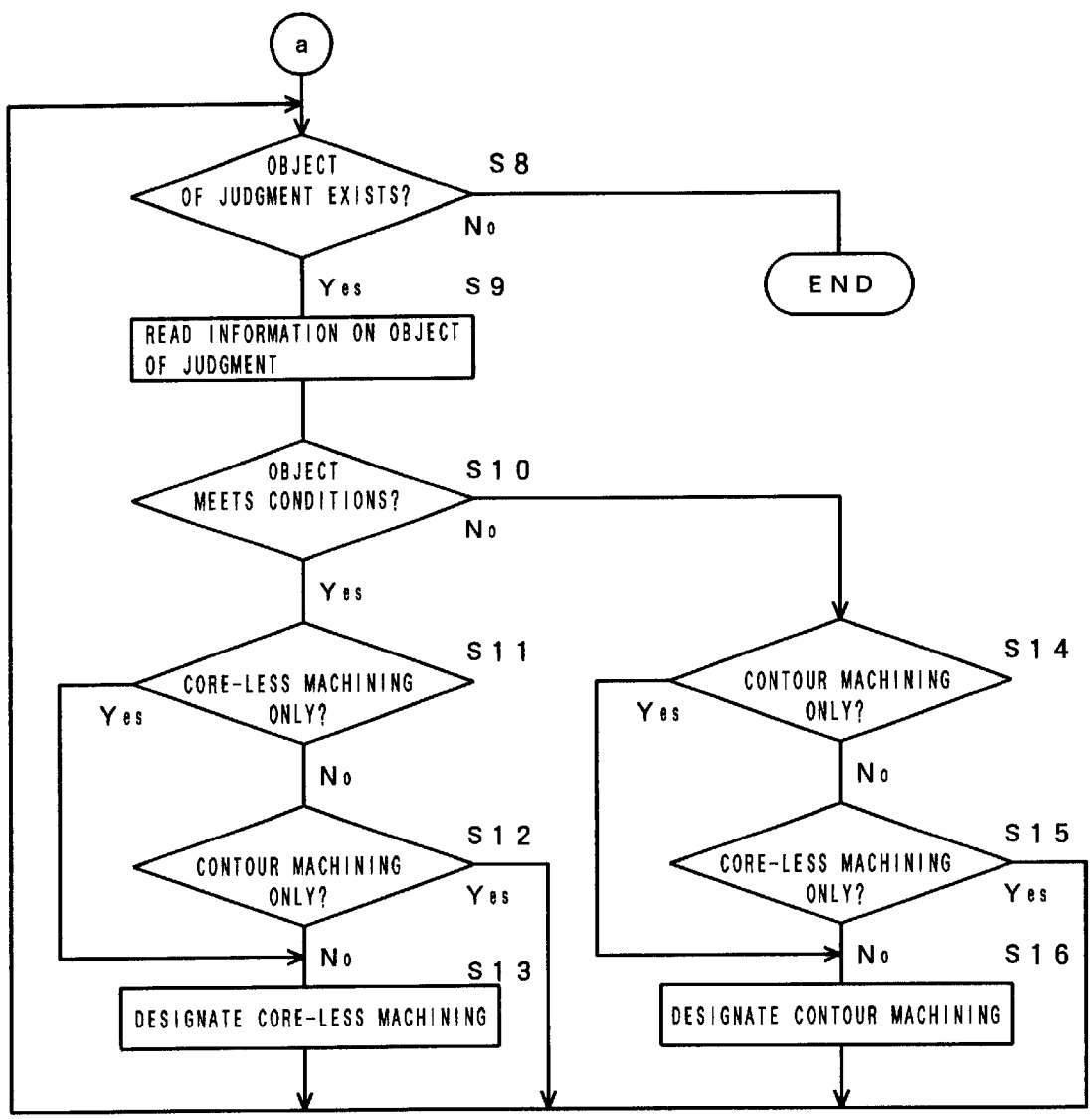
FIG. 4 is part of a flowchart continued from FIG. 3.

Next, referring to FIGS. 3 and 4, the process of determining a core-less machining shape, executed by the NC automatic programming device according to the present invention will be explained. Here, the work of designing machining shapes is supposed to have been already completed.

Starting the process of determining a core-less machining shape, the CPU 1 first opens on the display 2 a window provided for selecting a condition of judgment, and shows, in the window, names representing various conditions of judgment provided to be selected, that is, "maximum dimensions in horizontal and vertical directions", "size of diameter or radius", "peripheral length", "width" and "area", default values for the conditions of judgment which appear in a text input box of the window, and names representing ways of logical operation provided to be selected, that is, "logical product" and "logical sum". Then, the CPU 1 comes into a state of waiting for an operator to make a choice (Step S1).

The formation of a user interface for selecting a condition of judgment from those shown in the window is not limited to any particular one. For example, the following formation is easy to use: the window includes two boxes arranged to the left and right; in the left box, all the five names representing the conditions of judgment to be selected are listed; when the operator selects one name by the mouse 4 and clicks the mouse 4 on an addition button provided in the window, the selected name of condition of judgment is added to a list of selected conditions of judgment shown in the right box; if the operator has selected a wrong name of condition of judgment, the operator can cancel the wrong condition of judgment by selecting the name of the wrong condition of judgment from the list of selected conditions of judgment shown in the right box by the mouse 4 and clicking the mouse 4 on a deletion button provided in the window.

The values of maximum dimensions in horizontal and vertical directions, a diameter or a radius, a peripheral length and an area which have been used as criteria of judgment in the last performed process of determining whether to machine a shape by core-less machining are held in a preference file, and shown in the text input box in the window as default values. If necessary, those values can be changed by inputting numerical values from the text input box. The values thus changed are automatically stored to renew old values in the preference file when the window for selecting a condition of judgment is closed.

As the way of logical operation, one is selected between a "logical product" and a "logical sum". If the final judgment is to be performed based on a logical product or a logical sum of all the results of judgment which are obtained based on a plurality of selected conditions of judgment, the formation such that radio buttons are provided in the forefronts of the names "logical product" and "logical sum" so that the operator may click thereon is easy to use. It is to be noted that from the two radio buttons, only one can be selected at a time.

In order to meet the necessity of selecting three or more conditions ofjudgment and performing a logical operation including both a logical product and a logical sum, for example, a logical operation "maximum dimensions in horizontal and vertical directions" OR (=a logical sum) "peripheral length" AND (=a logical product) "area", the following formation is conceivable: a pallet carrying names of conditions of judgment such as "maximum dimensions in horizontal and vertical directions", "size of diameter or radius", "peripheral length", "width" and "area" and a pallet carrying symbols of operation for "logical product" and "logical sum" are provided so that the operator can drug and drop desired names and symbols of operation into the text input box and thereby construct an expression of logical operation in order to instruct the CPU 1 what operations to perform.

Finally, when the operator clicks on a completion button provided in the window, the CPU 1 memorizes the selected conditions of judgment, the values selected as criteria of judgment, and the selected way of logical operation (Step S2), closes the window for selecting a condition of judgment, and comes into a state of waiting for the operator to select a machining shape, that is, an object of judgment (Step S3).

At this time, the function of the cursor is automatically switched to a tool for choice. Therefore, the operator can easily select a machining shape, only by clicking the mouse 4 on a desired object. Generally, it is so arranged that when choices are made serially by clicking the mouse 4, previously selected objects are automatically canceled, but that when choices are made by operating the mouse 4 and the keyboard 3 in a combined manner, for example, by pressing a SHIFT key and clicking the mouse 4 simultaneously, a plurality of objects are selected serially.

It is also possible to select, in a lump, objects within a selected area denoted by a rubber band, or more specifically, objects totally included in the selected area denoted by the rubber band or objects at least slightly overlapping the selected area, by drawing a diagonal of the rubber band by drugging the mouse 4 or by drugging the mouse 4 and operating the keyboard 3 in a combined manner. If a wrong object is included in what have been selected, the wrong object can be canceled by making a choice again by the mouse 4. It is also possible to select all the objects in a lump by pressing shortcut keys in a combined manner, for example, by pressing a COMMAND key and an A key in a combined manner.

When the operator has finished selecting the objects and presses a return key, the CPU adds an attribute of being an object of judgment to the information about each selected object to thereby memorizes the objects of judgment (Step S4). Then, the CPU 1 opens a new window for selecting a way of adding attribute information in respect of the way of machining, shows names representing ways of adding attribute information, and comes into a state of waiting for the operator to make a choice (Step S5).

There are three ways of adding attribute information, that is, "designating only an attribute to be machined by core-less machining", "designating only an attribute to be machined by contour machining" and "designating an attribute to be machined by core-less machining or an attribute to be machined by contour machining". Also here, one is selected from among the three. Therefore, the formation such that radio buttons or the like are provided in the forefronts of the three names representing the three ways of adding attribute information so that the operator may click thereon can be adopted. It is to be noted that from the three radio buttons, only one can be selected at a time.

Another formation such that only two items, that is, "designating only an attribute to be machined by core-less machining" and "designating only an attribute to be machined by contour machining" are shown with check boxes so that the operator may check a desired check box by clicking the mouse 4 thereon can be also adopted. If both check boxes are checked, it means "designating an attribute to be machined by core-less machining or an attribute to be machined by contour machining".

When the operator has finished selecting the way of adding attribute information and clicks on a choice completion button provided in the window, the CPU memorizes the selected way of adding attribute information (Step S6), and comes into a state of waiting for the operator to press the return key (Step S7).

Figure 2:
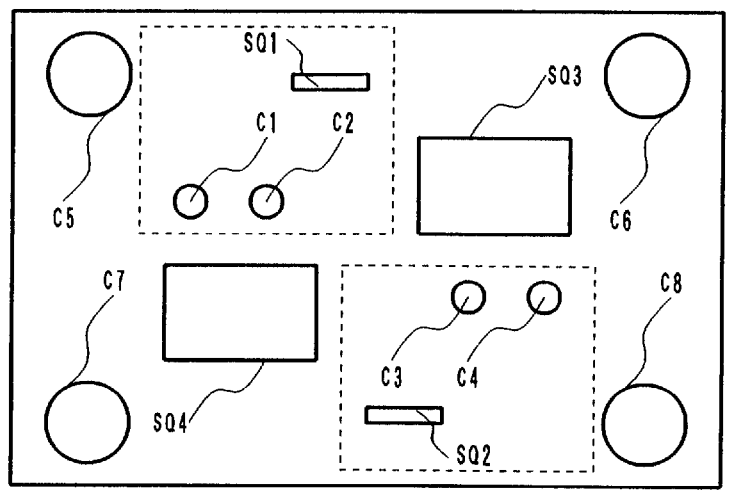
FIG. 2 is an example of presentation by a display in the NC automatic programming device of FIG. 1.

When the operator presses the return key, the CPU 1 judges whether there are objects to which an attribute of being an object of judgment has been added in Step S4 (Step S8). If there are objects to which an attribute of being an object of judgment has been added, the CPU 1 first reads information about one of such objects (Step S9), and then judges whether the information about the object meets the conditions for core-less machining, using a judgment program held in the hard disc 8 which corresponds to the conditions of judgment selected in Step S2, the values selected as reference values for the conditions of judgment, and the selected way of logical operation (Step For example, let the case be supposed in which, in Step S2, the "maximum dimensions in horizontal and vertical directions" and the "size of diameter or radius" have been selected as conditions of judgment to be combined, reference values for the condition of judgment "maximum dimensions in horizontal and vertical directions" have been selected to be 6 mm and 1.5 mm, a reference value for the condition of judgment "size of diameter or radius" has been selected to be 3 mm in diameter (1.5 mm in radius), and the "logical sum" has been selected as the way of logical operation, and in Step S4, machining shapes as shown in FIG. 2 have been all selected as objects of judgment. In this case, if shapes C1 to C4 are circles of 2 mm in diameter, shapes C5 to C8 circles of 4 mm in diameter, shapes SQ1 and SQ2 rectangles of 5 mm×1 mm and shapes SQ3 and SQ4 rectangles of 10 mm×7 mm, the shapes which meet the above conditions and are therefore judged to be machining shapes by core-less machining are the circles C1 to C4 and the rectangles SQ1 and SQ2 (the objects within areas denoted by broken lines in FIG. 2).

If the information about an object read in Step S9 meets the conditions for core-less machining, that is, if the judgment in Step S10 is "yes", then the CPU 1 judges whether the way of adding attribute information selected in Step S6 is "designating only an attribute to be machined by core-less machining" or not (Step S11). If the selected way of adding attribute information is "designating only an attribute to be machined by core-less machining", the CPU 1 adds an attribute to be machined by core-less machining to the information about the present object read in Step S9 (Step S13).

If the selected way of adding attribute information is not "designating only an attribute to be machined by core-less machining", that is, if the judgment in Step S11 is "no", then the CPU 1 judges whether the way of adding attribute information selected in Step S6 is "designating only an attribute to be machined by contour machining" or not (Step S12). If the selected way of adding attribute information is "designating only an attribute to be machined by contour machining", the CPU 1 skips Step S13 of adding an attribute to be machined by core-less machining to the information about the present object.

If the selected way of adding attribute information is not "designating only an attribute to be machined by contour machining", that is, if the judgment in Step S12 is "no", this means that "designating an attribute to be machined by core-less machining or an attribute to be machined by contour machining" has been selected. Therefore, the CPU 1 adds an attribute to be machined by core-less machining to the information about the present object read in Step S9, as mentioned above (Step S13).

If the information about an object read in Step S9 does not meet the conditions for core-less machining, that is, if the judgment in Step S10 is "no", then the CPU 1 judges whether the way of adding attribute information selected in Step S6 is "designating only an attribute to be machined by contour machining" or not (Step S14). If the selected way of adding attribute information is "designating only an attribute to be machined by contour machining", the CPU 1 adds an attribute to be machined by contour machining to the information about the present object read in Step S9 (Step S16).

If the selected way of adding attribute information is not "designating only an attribute to be machined by contour machining", that is, if the judgment in Step S14 is "no", then the CPU 1 judges whether the way of adding attribute information selected in Step S6 is "designating only an attribute to be machined by core-less machining" or not (Step S15). If the selected way of adding attribute information is "designating only an attribute to be machined by core-less machining", the CPU 1 skips Step S16 of adding an attribute to be machined by contour machining to the information about the present object.

If the selected way of adding attribute information is not "designating only an attribute to be machined by core-less machining", that is, if the judgment in Step S15 is "no", this means that "designating an attribute to be machined by core-less machining or an attribute to be machined by contour machining" has been selected. Therefore, the CPU 1 adds an attribute to be machined by contour machining to the information about the present object read in Step S9, as mentioned above (Step S16).

Finishing the above process, the CPU 1 returns to Step S8 and judges whether there are still other objects to which an attribute of being an object of judgment has been added. If there are other objects to which an attribute of being an object of judgment has been added, the CPU 1 reads information about one of those objects having an attribute of being an object of judgment (Step S9), and performs the process of Steps S10 through S16 as mentioned above, again. Thus, the CPU 1 performs one process selected from among the process of designating only an attribute to be machined by core-less machining to an object to be machined by core-less machining, the process of designating only an attribute to be machined by contour machining to an object to be machined by contour machining, and the process of designating an attribute to be machined by core-less machining to an object to be machined by core-less machining, or designating an attribute to be machined by contour machining to an object to be machined by contour machining.

The process of Steps S9 through S16 is performed for all the objects to which an attribute of being an object of judgment has been added in step 4. When there is no more object about which information needs to be read, the judgement in Step S8 turns "no", and the process of determining whether to machine a shape by core-less machining ends.

It may be so arranged that automatic generation of NC machining programs starts when the judgment in Step S8 turns "no" and the process of determining whether to machine a shape by core-less machining ends.

According to the present invention, an attribute to be machined by core-less machining or an attribute to be machined by contour machining is designated to data about a shape which has been created in advance, automatically by the system for creating NC data for wire-cut machining, without requiring an operator's judging the size of a shape. Therefore, there is no fear of missing a machining shape or misjudging the size of a machining shape, and machining shapes by core-less machining as well as machining shapes by contour machining can be given appropriate attributes in respect of machining.

Further, since the way of judging the size of a machining shape can be arbitrarily determined by selecting a plurality of ways of judgment and combining the results of those ways of judgment by a logical product or a logical sum, the size of a machining shape can be judged in an optimal way depending on the characteristics of the machining shape.

What is claimed is:

1. A method of determining core-less machining shape using an apparatus for creating NC data for wire-cut electric discharge machining, said method comprising:
    (a) storing a plurality of ways of judgment for judging a size of a machining shape based on the machining shape created in advance;
    (b) selecting one or more ways of judgment from the ways of judgment stored in said operation (a) and designating a logical operation to be performed on a result of the judgment;
    (c) performing the ways of judgment selected in operation (b) and judging the size of said machining shape based on a value predetermined for each of the ways of judgment; and
    (d) executing the logical operation selected in said operation (b) on the result of judgment performed in said operation (c) and automatically determining whether a core-less machining or a contour machining is to be applied to said machining shape based on the result of the logical operation.

2. A system for creating NC data for wire-cut electric discharge machining, comprising:
    memory means for storing a plurality of ways of judgment for judging a size of a machining shape based on data of the machining shape created in advance;
    way-of-judgment selecting means for selecting one or more ways of judgment in said plurality of ways of judgment;
    logical operation selecting means for selecting a logical operation to be performed on a result of the judgment;
    judging means for performing the ways of judgment selected by said way-of-judgment selecting means and judging a size of the machining shape based on a set value predetermined for each of the ways of judgment;
    logical operation performing means for performing the logical operation selected by said logical selecting means on the result of the selected ways of judgment performed by said judgment means; and
    means for automatically determining core-less machining or contour machining to be designated to the machining shape based on the result of said logical operation.

3. A computer readable storage medium for an apparatus for creating NC data for wire-cut electric discharge machining, said storage medium storing a core-less machining shape determining program comprising:
    a plurality of different machining shape judging units judging a size of a machining shape;
    a logical unit executing a designated logical operation on a result of judgment of selected one or more machining shape judging units; and
    a determining unit automatically determining a core-less machining or a contour machining to be applied to the machining shape based on the result of the logical operation.

4. A method, comprising:
    selecting one or more ways of judgment from a plurality of ways of judgment stored in a storage unit and designating a logical operation to be performed on a result of the judgment;

performing the ways of judgment selected in said selecting and judging a size of a machining shape based on a value predetermined for each of the ways of judgment; and executing the logical operation selected in said selecting on the result of judgment performed in said performing and automatically determining whether a core-less machining or a contour machining is to be applied to said machining shape based on the result of the logical operation.

5. A computer readable storage, controlling a computer by:

selecting one or more ways of judgment from a plurality of ways of judgment stored in a storage unit and designating a logical operation to be performed on a result of the judgment;

performing the ways of judgment selected in said selecting and judging a size of a machining shape based on a value predetermined for each of the ways of judgment; and executing the logical operation selected in said selecting on the result of judgment performed in said performing and automatically determining whether a core-less machining or a contour machining is to be applied to said machining shape based on the result of the logical operation.

6. An apparatus, comprising:

a selecting unit selecting one or more ways of judgment from a plurality of ways of judgment stored in a storage unit and designating a logical operation to be performed on a result of the judgment;

a performing unit performing the ways of judgment selected by said selecting unit and judging a size of a machining shape based on a value predetermined for each of the ways of judgment; and an executing unit executing the logical operation selected in said selecting unit based on the result of judgment performed by said performing unit and automatically determining whether a core-less machining or a contour machining is to be applied to said machining shape based on the result of the logical operation.

* * * * *

UNITED STATES PATENT AND TRADEMARK OFFICE
CERTIFICATE OF CORRECTION

PATENT NO.    : 6,356,799 B1
DATED         : March 12, 2002
INVENTOR(S)   : Takashi Takegahara et al.

It is certified that error appears in the above-identified patent and that said Letters Patent is hereby corrected as shown below:

<u>Title page,</u>
Item [30], Foreign Application Priority Data, change "9-212696" to -- 212696 --

<u>Column 4,</u>
Line 51, after "of" insert a space.

<u>Column 5,</u>
Line 2, insert a space after the word "of".
Line 3, insert a space after the word "of".
Lines 32-33, insert a space after the word "of"

<u>Column 6,</u>
Line 8, insert a space after the word "of" and before "judgment"
Line 10, after "(Step" insert -- S10) --.

<u>Column 7,</u>
Lines 32, 34 and 47, insert a space after each occurrence of the word "of".

<u>Column 9,</u>
Line 2, before "machining" delete "a"
Line 2, insert the word -- said -- after the word "of"
Line 19, before "machining" delete "a".
Line 19, insert the word -- said -- after the word "of".

Signed and Sealed this

Fourth Day of February, 2003

JAMES E. ROGAN
*Director of the United States Patent and Trademark Office*